(12) United States Patent
Mentzer et al.

(10) Patent No.: US 7,671,539 B1
(45) Date of Patent: Mar. 2, 2010

(54) SYSTEMS AND METHODS FOR GENERATING OPTICAL ENERGY USING A LIGHT-EMITTING DIODE

(75) Inventors: Mark A. Mentzer, Lititz, PA (US); Nicholas P. Petrillo, New Cumberland, PA (US); Wayne A. Webb, Lancaster, PA (US)

(73) Assignee: Advanced Precision Inc., Mechanicsburg, PA (US)

( * ) Notice: Subject to any disclaimer, the term of this patent is extended or adjusted under 35 U.S.C. 154(b) by 483 days.

(21) Appl. No.: 11/649,142

(22) Filed: Jan. 3, 2007

Related U.S. Application Data

(60) Provisional application No. 60/859,324, filed on Nov. 16, 2006.

(51) Int. Cl.
H05B 37/02 (2006.01)
(52) U.S. Cl. .................. 315/149; 315/151; 315/157; 315/291
(58) Field of Classification Search ......... 315/149–159, 315/291, 307–309
See application file for complete search history.

(56) References Cited

U.S. PATENT DOCUMENTS

| | | | | |
|---|---|---|---|---|
| 4,032,817 | A | * | 6/1977 | Richmond ................... 315/149 |
| 4,234,820 | A | * | 11/1980 | Widmayer ................... 315/152 |
| 4,284,884 | A | | 8/1981 | Dyment et al. .............. 250/205 |
| 4,998,043 | A | | 3/1991 | Unami et al. |
| 5,229,596 | A | * | 7/1993 | Ujihara .................... 250/208.1 |
| 5,345,167 | A | | 9/1994 | Hasegawa et al. |
| 6,097,159 | A | | 8/2000 | Mogi et al. |
| 6,303,916 | B1 | | 10/2001 | Gladnick |
| 6,441,558 | B1 | * | 8/2002 | Muthu et al. ................. 315/149 |
| 6,624,892 | B1 | | 9/2003 | Johnston |
| 6,649,896 | B2 | | 11/2003 | Birrer et al. |
| 6,720,544 | B2 | | 4/2004 | Barna et al. |
| 6,831,290 | B2 | | 12/2004 | Mentzer |
| 6,891,142 | B2 | | 5/2005 | Ogawa |
| 7,157,681 | B1 | | 1/2007 | Tetzlaff |
| 7,276,863 | B2 | * | 10/2007 | Lee et al. ..................... 315/307 |
| 2003/0076056 | A1 | * | 4/2003 | Schuurmans ................ 315/291 |
| 2005/0040773 | A1 | * | 2/2005 | Lebens et al. ............... 315/291 |

OTHER PUBLICATIONS

"Agilent Technologies Application Brief, 1-007," *Projection of Long Term Light Output Performance for AS AlinGaP LED Technology*, 1999, 2 pages, Date: Nov. 1999.
Meyrath, T.P., *Multipurpose Analog PID Controller*, Todd P. Meyrath, Atom Optics Laboratory Center for Nonlinear Dynamics, University of Texas at Austin, Mar. 14, 2000, 1-6.
Simpson, J.O., et al., "Fundamental insight on developing low dielectric constant polyimides," NASA Langley Res. Center, 1-19.

* cited by examiner

*Primary Examiner*—David Hung Vu
*Assistant Examiner*—Tung X Le
(74) *Attorney, Agent, or Firm*—Smith, Gambrell & Russell, LLP

(57) ABSTRACT

Systems for providing optical energy comprise an LED, a detector of optical energy, such as a photodiode, that measures the intensity of optical energy emitted by the light-emitting diode, and a controller. The controller adjusts the intensity of the optical energy emitted by the LED based on the intensity measurement provide by the photodiode, to maintain the intensity of the emitted optical energy at a desired level.

26 Claims, 11 Drawing Sheets

PID Loop Parameters

| Parameter | Setting |
|---|---|
| Loop Time | 0.5 seconds |
| Proportional gain $K_p$ | 0.200 |
| Integration time $T_i$ | 0.3 seconds |
| Differentiation Time $T_d$ | 540 microseconds |

FIG. 7

SYSTEMS AND METHODS FOR GENERATING OPTICAL ENERGY USING A LIGHT-EMITTING DIODE

CROSS REFERENCE RELATED APPLICATION

This application claims priority under 35 U.S.C. §119(e) to U.S. provisional application No. 60/859,324, filed Nov. 16, 2006, the contents of which is incorporated by reference herein in its entirety.

TECHNICAL FIELD

The present application relates to the generation of optical energy using light-emitting diodes (LEDs). More particularly, the application relates to LED systems having outputs with a stabilized intensity, and methods for providing optical energy of stable intensity from an LED.

BACKGROUND

Many electronic devices, such as analog optical sensors, require a stable source optical energy. Thermoelectrically-cooled lasers have typically been used as sources of stabilized optical energy. Recent developments in the field of low-cost, high-intensity, super-luminescent LEDs, however, have made it desirable to use these types of devices in lieu of lasers in some applications.

The intensity of the optical energy generated by an LED, however, typically varies with the temperature of the LED. LEDs can be required to operate over temperature ranges as great as, or greater than −40° C. to +70° C. For example, the output intensity of certain types of surface-mount LEDs can fluctuate by as much as ten percent when the temperature decreases from ambient to about −40° C., or increases from ambient to about +70° C. Moreover, the output intensity usually varies as the LED ages. For example, the output intensity of certain types of LEDs can decrease over the operational life of the LED by as much as 27 percent.

Optical signals, in general, are usually monitored by tapping a relatively small, predetermined fraction of optical energy from the optical fiber carrying the signal. For example, a tapping fiber may be wrapped around and fused with the optical fiber carrying the signal. Alternatively, the optical fiber carrying the signal may be sharply bent so that a fraction of the optical energy escapes from the optical fiber. It is believed that the ratio of the tapped optical energy to the optical signal can vary by ten percent or more using each of these techniques. Stabilizing the intensity of the optical output of an LED, it is believed, requires measurement of the intensity with an accuracy of about one percent or better.

Consequently, an ongoing need exists for a system and method for providing optical energy of stabilized intensity using an LED.

SUMMARY

Systems for providing optical energy comprise an LED, a detector of optical energy, such as a photodiode, that measures the intensity of optical energy emitted by the light-emitting diode, and a controller. The controller adjusts the intensity of the optical energy emitted by the LED based on the intensity measurement provide by the photodiode, to maintain the intensity of the emitted optical energy at a desired level.

Embodiments of systems comprise a light-emitting diode, a detector of optical energy in optical communication with the light-emitting diode, and a controller communicatively coupled to the light-emitting diode. The controller adjusts an output of the light-emitting diode in response to an output of the detector of optical energy.

Methods comprise generating optical energy using a light-emitting diode, measuring an intensity of the optical energy, and changing the intensity of the optical energy in response to the measured intensity of the optical energy.

Other embodiments of systems comprise a light-emitting diode, a detector of optical energy, and a closed loop controller operatively coupled to the light-emitting diode and the detector of optical energy.

Other methods comprise energizing a light-emitting diode, monitoring an intensity of optical energy emitted by the light-emitting diode, and changing an operating parameter of the light-emitting diode based on the intensity of the optical energy emitted by the light-emitting diode.

BRIEF DESCRIPTION OF THE DRAWINGS

The foregoing summary, as well as the following detailed description of embodiments, are better understood when read in conjunction with the appended diagrammatic drawings. For the purpose of illustrating the embodiments, the drawings diagrammatically depict specific embodiments. The appended claims are not limited, however, to the specific embodiments disclosed in the drawings. In the drawings:

FIG. 7 is a table listing various operating parameters of a control loop of the system shown in FIG. 6;

DETAILED DESCRIPTION OF ILLUSTRATIVE EMBODIMENTS

The figures depict an embodiment of a system 10 for generating optical energy. The system 10 comprises an LED 12, and a detector of optical energy in the form of a photodiode 14.

The LED 12 and the photodiode 14 can be mounted on a substrate by a suitable technique such as soldering. The substrate can be, for example, a printed circuit board (PCB) 18 shown in FIG. 2. The PCB 18 has a first surface 20 that faces a first direction, and a second surface 22 that faces a second direction opposite the first direction.

Figure 2:
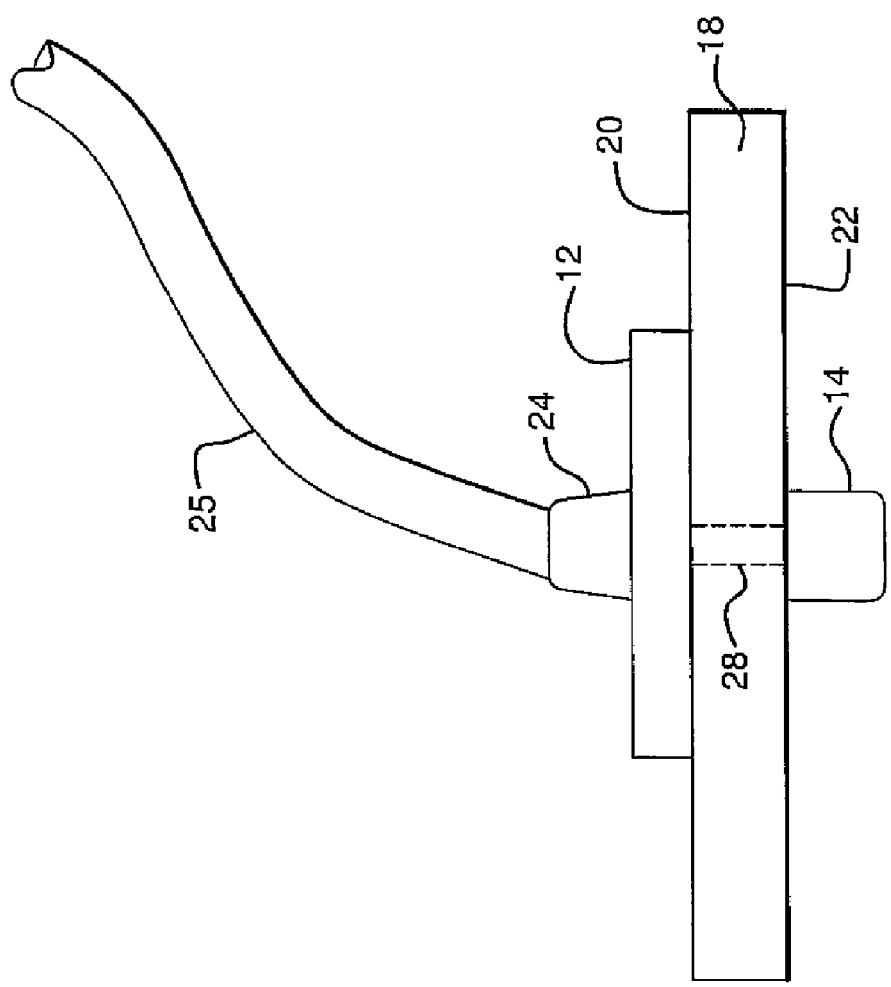
FIG. 2 is a side view of an LED and a photodiode of the system shown in FIG. 1.

The LED 12 can be mounted on the first surface 20, and the photodiode 14 can be mounted the second surface 22. The first and second surfaces 20, 22 are depicted in FIG. 2 as upwardly and downwardly facing for exemplary purposes only. The LED 12, photodiode 14, and substrate 16 can be disposed in other orientations, including orientations in which the first and second surfaces 20, 22 face downwardly and upwardly, respectively, or sideways.

The LED 12 emits optical energy in omni-directional manner, i.e., in all directions, although the primary direction of emission is upward. An optical connector 24 is mounted is mounted on the upper portion of the LED 12. The optical connector 24 can be, for example, a SMA connector. The optical connector 24 transmits the upwardly-directed optical energy from the LED 12 to a fiber optic cable 25. The fiber optic cable 25, in turn, transmits the optical energy to a device, such as an analog optical sensor package (not shown), that requires the use of optical energy.

Directional terms such as "upward," "downward," "above," "below," etc., are used with reference to the component orientations depicted in FIG. 2. These terms are used for illustrative purposes only and, unless specifically noted, are not intended to limit the scope of the appended claims.

The LED 12 should be chosen so that the LED 12 can be safely driven at levels sufficient to maintain a desired output intensity as the LED 12 ages, or as the temperature of LED 12 fluctuates during operation.

A through hole 28 is formed in the PCB 18, as shown in FIG. 2. The through hole 28 extends between the first and second surfaces 20, 22. The through hole 28 is aligned with the LED 12 and the photodiode 14 so that the optical energy emitted by the LED 12 in the downward direction reaches the photodiode 14 by way of the through hole 28.

The photodiode 14 generates an electrical output proportional to the intensity of the optical energy incident thereupon. The use of the photodiode 14 as the detector of optical energy in the system 10 is disclosed for exemplary purposes only. Other types of detectors can be used in the alternative.

Figure 1:
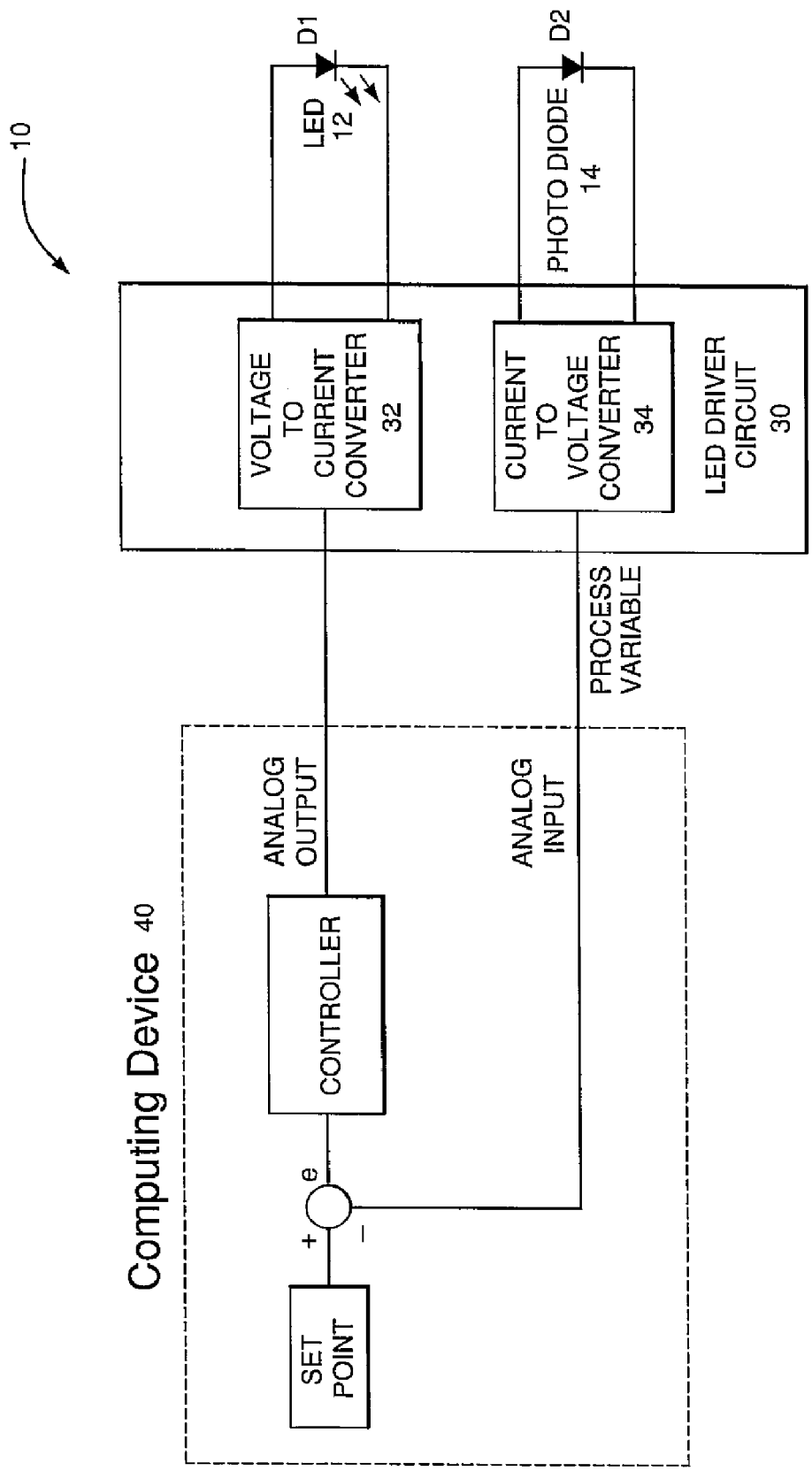
FIG. 1 is a block diagram depicting an embodiment of a system for generating optical energy.
Figure 3:
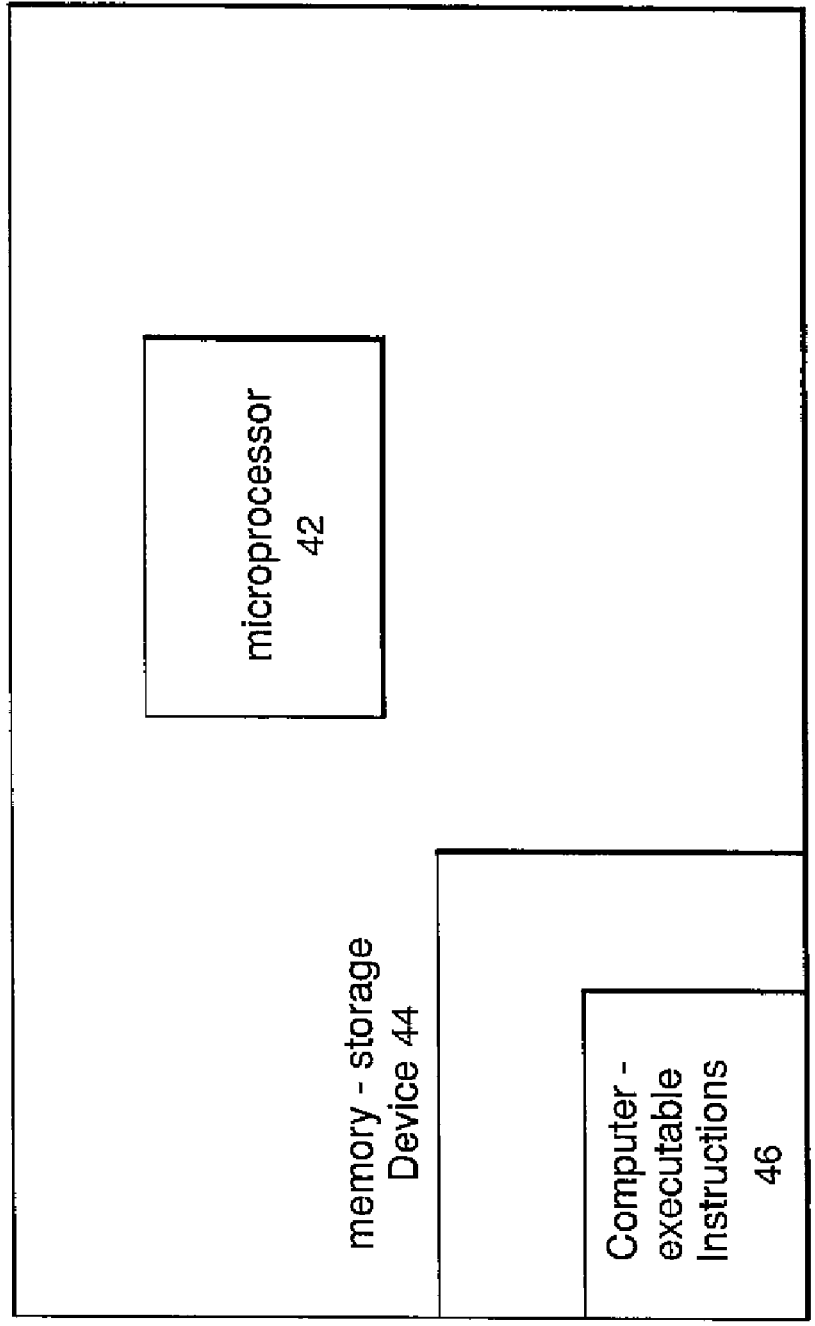
FIG. 3 is a block diagram of a computing device of the system shown in FIGS. 1 and 2.
Figure 4:
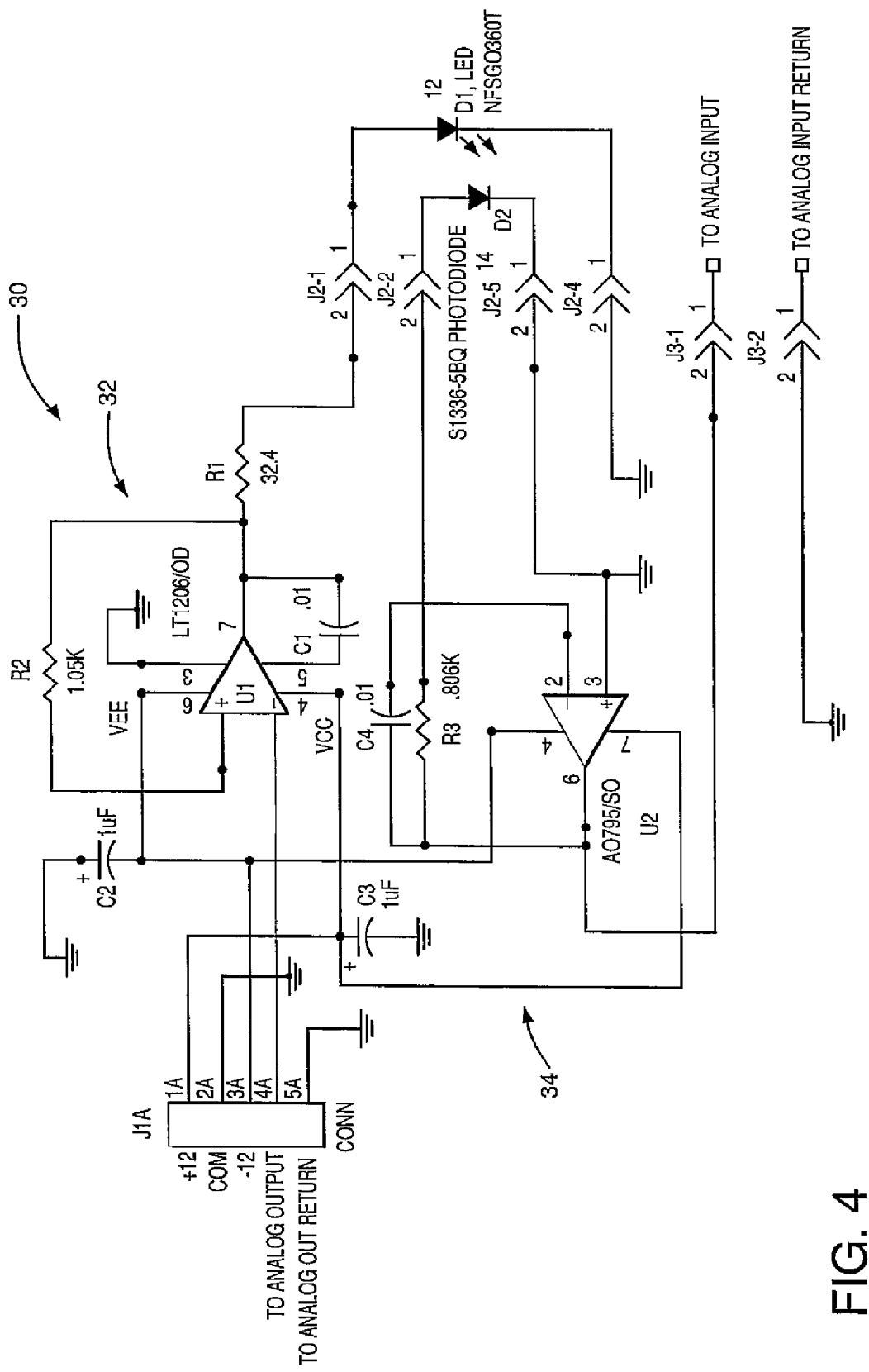
FIG. 4 is a schematic diagram of an LED driver circuit of the system shown in FIGS. 1-3.

The system 10 further comprises an LED driver circuit 30 and a computing device 40, as shown in FIGS. 1, 3, and 4. The LED driver circuit 30 comprises a voltage to current converter 32 communicatively coupled to the computing device 40 and the LED 12. The voltage to current converter 32 converts the analog output voltage of the computing device 40 into a current that drives the LED 12.

The driver circuit 30 also comprises a current to voltage converter 34 communicatively coupled to the computing device 40 and the photodiode 14. The current to voltage converter 34 converts the output current of the photodiode 14 into an analog voltage that is input to the computing device 40.

The LED driver circuit 30 is depicted schematically in FIG. 4. The voltage to current converter 32 of the LED driver circuit 30 comprises a first operational amplifier U1, first and second resistors R1, R2, and a first capacitor C1. The first and second resistors R1, R2 are used to set the gain of the operational amplifier U1. The first capacitor C1 is a compensation capacitor associated with the operational amplifier U1.

The current to voltage converter 34 comprises a second operational amplifier U2, a third resistor R3, and fourth capacitor C4. The third resistor R3 and the fourth capacitor C4 are used to set the respective gain and bandwidth of the operational amplifier U2.

The LED driver circuit 30 also includes second and third capacitors C2, C3 that function as bypass capacitors that help to maintain the stability of the power supply (not shown) of the LED driver circuit 30.

Specific details of the LED driver circuit 30 are presented for exemplary purposes only. Alternative embodiments can include circuitry configured in other manners to effectuate the noted current and voltage conversions.

The system 10 further comprises a computing device 40. The computing device 40 comprises a processor such as a microprocessor 42, as shown in FIG. 3. The computing device 40 also includes a non-volatile memory-storage device 44, such as flash memory or read only memory, communicatively coupled to the microprocessor 42. The computing device 40 further includes a set of computer executable instructions 46 stored on the memory-storage device 44.

The computing device 40 functions as a closed loop controller that regulates the optical output of the LED 12 to maintain the intensity of the output at a substantially constant level. In particular, the computing device 40 is programmed with a proportional-integral-differential (PID) control algorithm. The PID control algorithm can be expressed as follows:

$$u(t) = K_c\left(e + \frac{1}{T_i}\int_0^t e\,dt + T_d\frac{de}{dt}\right) \quad (1)$$

where u(t) is the system output, e is the error signal, $T_i$ is the integration time, and $T_d$ is the differentiation time. The error signal e is a result of the difference between the set point for the operation and the process variable.

The transfer function of the PID control algorithm expressed in Laplace form is as follows:

$$G_{(s)} = \frac{K_d s^2 + K_p + K_i}{s} \quad (2)$$

where $G_{(s)}$ is the PID control algorithm transfer function, $K_d$ is the differential gain, $K_p$ is the proportional gain, and $K_i$ is the integral gain.

Figure 5:
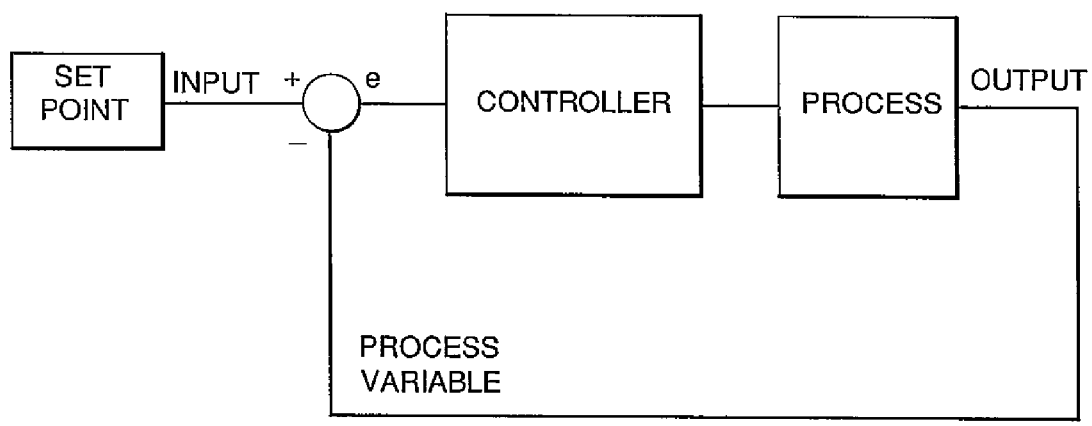
FIG. 5 is a block diagram of a closed loop control process.

FIG. 5 is a generalized block diagram of a feedback control loop for a process that generates an output. The output represents the process variable, and is fed back to a summing point. An error signal "e" is generated at the summing point based on the difference between the output (the process variable) and the set point.

The error signal is sent to the controller depicted in FIG. 5. The controller has a transfer function specific to the type of control algorithm used in the particular application. In the case of a controller based on the PID algorithm, the controller uses the transfer function represented by equation (2) above, and generates an output that is the sum of a proportion, an integral, and a derivative of the error signal.

The output of the controller is fed as an input to the process depicted in FIG. 5. Each change in the process variable, i.e., the output of the process, results in a change in the error signal. The change in the error signal, in turn, causes a change in the output of the controller. Steady-state operation for the process occurs when the error signal and the set point are approximately equal.

The control loop effectuated by the system 10 is depicted in FIG. 1. The current to voltage converter 34 converts the output current of the photodiode 14 into an analog voltage, as discussed above. The output voltage of the current to voltage converter 34 represents the process variable, and is input to the computing device 40. The computing device 40 generates an error signal "e" based on the difference between the process variable and a predetermined set point which is programmed into the controller 40.

The computing device 40 functions as a closed-loop controller. In particular, the computing device 40 is programmed with the PID transfer function represented by equation (2). The computing device 40 thus generates an output voltage based on the sum of a proportion, an integral, and a derivative of the error signal. The output voltage of the computing device 40 is input to the voltage to current converter 32, which converts the output voltage to a current. The current is input to, and energizes the LED 12.

Changes in the output of the photodiode 14 cause a corresponding change in the output voltage of the current to voltage converter 34, which in turn results in a change in the error signal. The computing device 40 increases or decreases its voltage output in response to the error signal, based on the PID algorithm. The computing device 40 thereby causes the intensity of the optical energy generated by the LED 12 to vary in a manner that drives the process variable toward the set point. The intensity of the output of the LED 12 is stabilized when the process reaches a steady-state condition, i.e., when the process variable and the set point are approximately equal.

An LED system having an output whose intensity is stabilized in the above-noted manner was constructed by the Applicants. The output of the system was evaluated under changing temperatures, and at different set points. The system is depicted in part in FIG. 6, and is hereafter referred to as "the prototype system."

Figure 6:
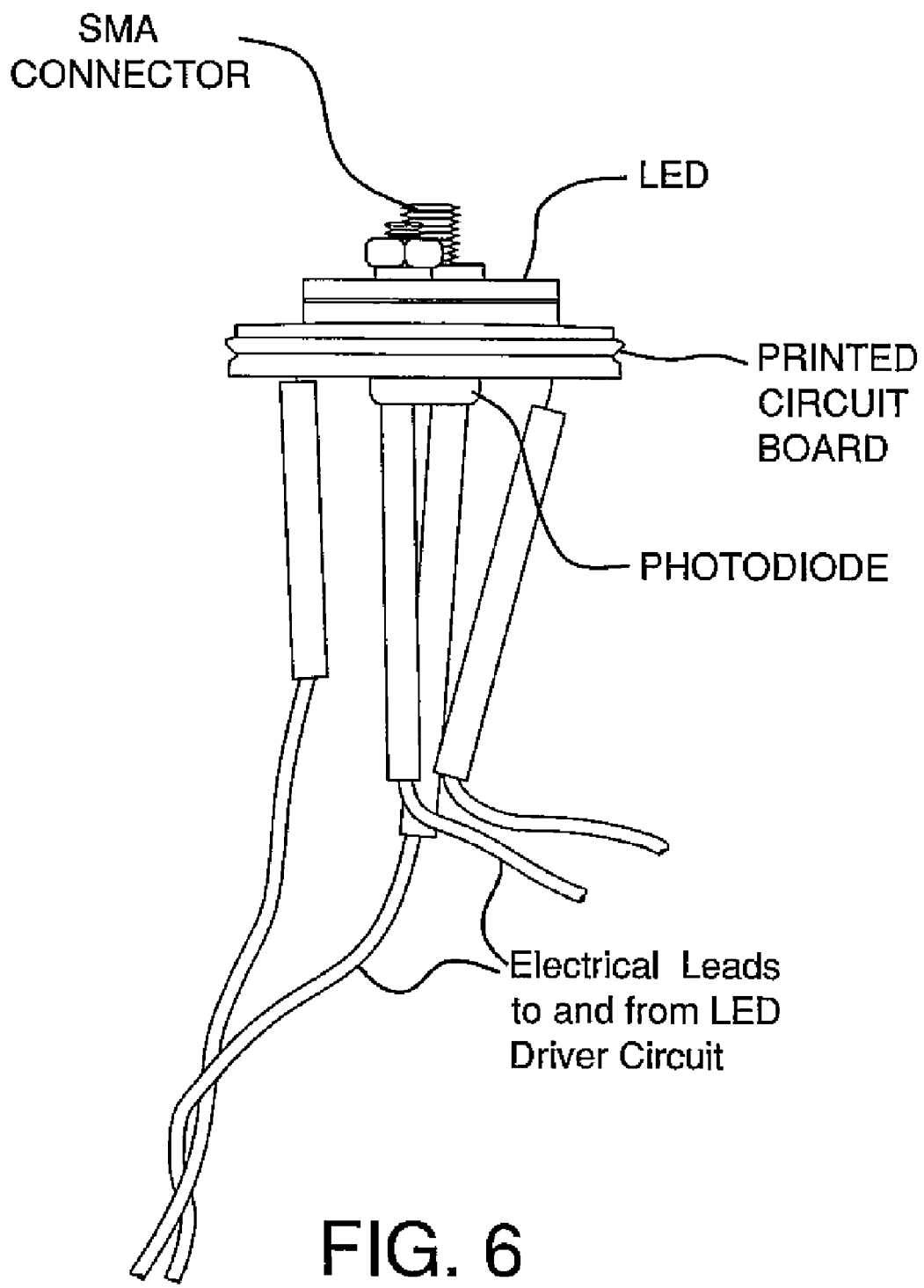
FIG. 6 is a side view of an LED and a photodiode of a prototype system for generating optical energy.

The prototype system included a surface-mount LED. A Nichia Corporation NSFG036BT LED was used as the LED. The LED was soldered to a printed circuit board as depicted in FIG. 6.

An SMA connector was mounted on the upwardly-facing side of the LED, i.e., on the side of the LED opposite the PCB. A three-meter long fiber optic cable (not shown in FIG. 6) was connected to the SMA connector.

The fiber optic cable of the prototype system was connected to an optical power meter capable of measuring the intensity of the optical energy emitted by the LED. An Oz Optics Limited 23700 POM-300-VIS hand held optical power meter was used as the optical power meter. The optical energy emitted by the LED in the upward direction, i.e., in a direction away from the PCB, was measured using the optical power meter.

The photodiode of the prototype system was mounted on an underside of the printed circuit board, and was in optical communication with the LED by way of a through hole (not shown) formed in the circuit board. A Hamamatsu S1336-5BQ photodiode was used as the photodiode.

A Dell INSPIRON 9300 notebook computer was used as the computing device. The notebook computer was programmed with the PID transfer function represented by equation (2). The parameters listed in the table presented as FIG. 7 were used to characterize the PID control loop. The notebook computer was programmed with National Instruments Commercial Off The Shelf software products comprising LABVIEW version 8.0 and PID version 8.20.

The values for the parameters listed in the table of FIG. 7 were chosen for illustrative purposes only. The optimal values are application dependent, and can vary with factors such as the desired settling time, maximum acceptable steady-state error, and pulse rate for the system. The parameters can also be chosen to optimize the response of the system when equipped with a particular type of LED or photodiode.

The prototype system included an LED driver substantially identical to the LED driver 30 depicted in FIG. 4. The current to voltage converter of the LED driver was communicatively coupled to the photodiode and the computing device of the prototype system, and provided an analog input voltage to the computing device based on the output current of the photodiode. The voltage to current converter was communicatively coupled to the LED and the computing device, and provided an input current to the LED based on the analog output voltage of the computing device.

The LED of the prototype system was operated at a constant set point of about 8.067 volts, while the temperature of the LED was varied between about −30° C. and about +70° C. The set point was chosen to correspond to an output intensity for the LED of about 172 μW measured at the end of the three-meter fiber optic cable. The LED was operated on a continuous basis, i.e., without pulsing. The temperature of the LED was varied by placing the LED, the substrate, and the photodiode in a temperature chamber, and increasing temperature incrementally. The output of the LED was measured using the optical meter.

The feedback loop was deactivated at each temperature setting after an initial intensity reading was obtained at the setting. An intensity reading was then obtained with the feedback control loop inactive. The feedback control loop was subsequently activated, and the temperature of the LED was increased to the next incremental setting. Back to back intensity readings were thus obtained with the system operated in closed loop and open loop control modes.

Figure 8:
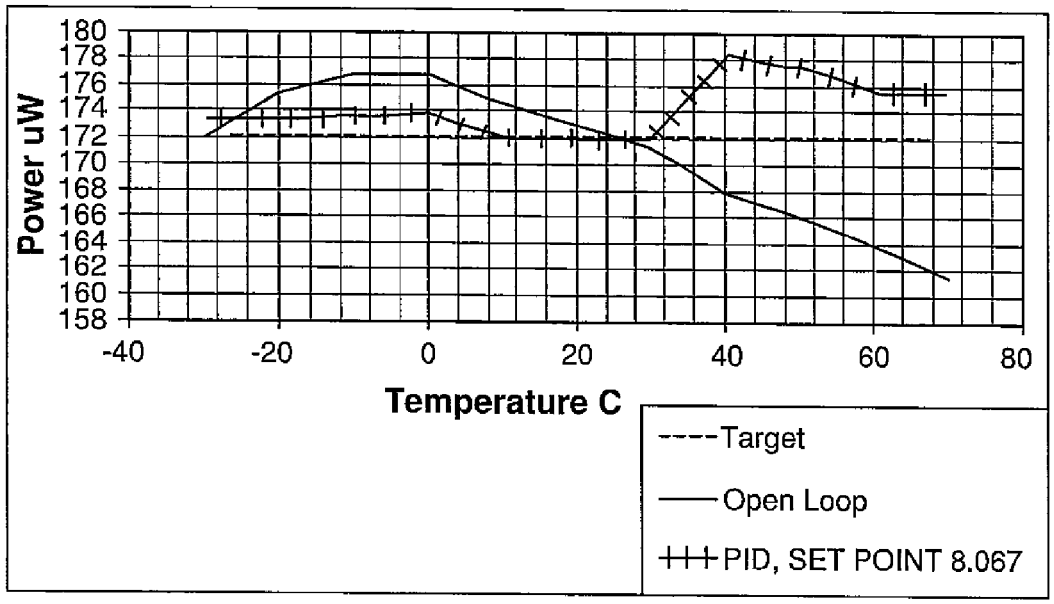
FIGS. 8 and 9 are graphical depiction of variations in the measured intensity of the output of the LED shown in FIG. 6, as a function of temperature.

The results of the above procedure are depicted in FIG. 8. The variation in the measured intensity of the output of the LED was about 6.6 μW over the temperature range of about −30° C. to about +70° C., when the feedback control loop was active. Moreover, the prototype system maintained the process variable, i.e., the output voltage of the current to voltage converter, within about +/−3 mV of the 8.067-volt set point. This level of error between the set point and the process variable is considered negligible. The settling time of the prototype system was about three seconds, which is also considered negligible.

The measured intensity of the LED of the prototype system varied by about 16.1 μW over the above-noted temperature range when the feedback control loop was inactive. The closed loop control effectuated by the prototype system thus substantially reduced variations in the intensity of the output of the LED as a function of temperature.

Figure 9:
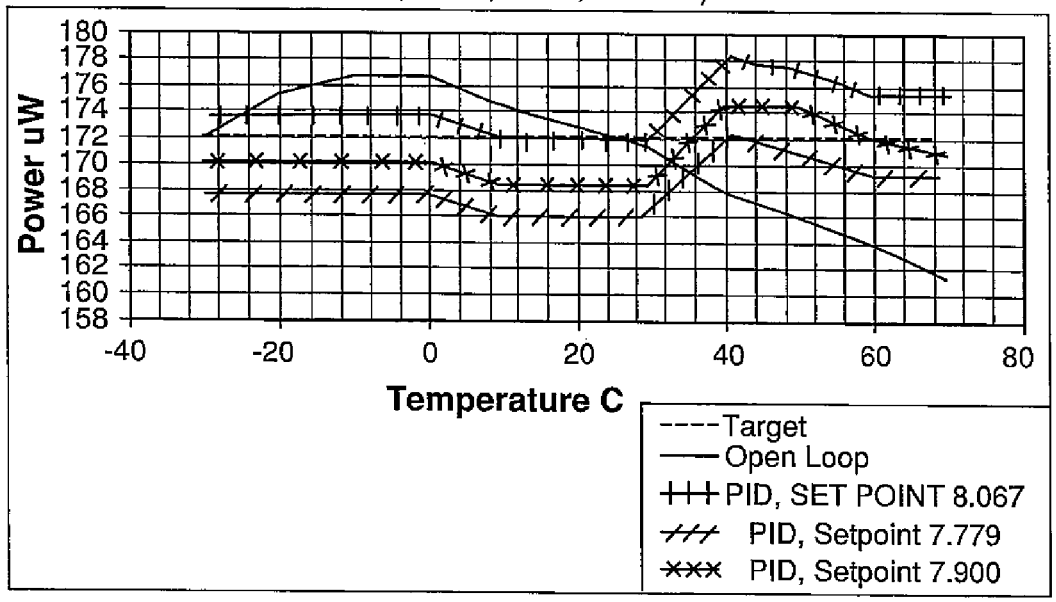
Figure 10:
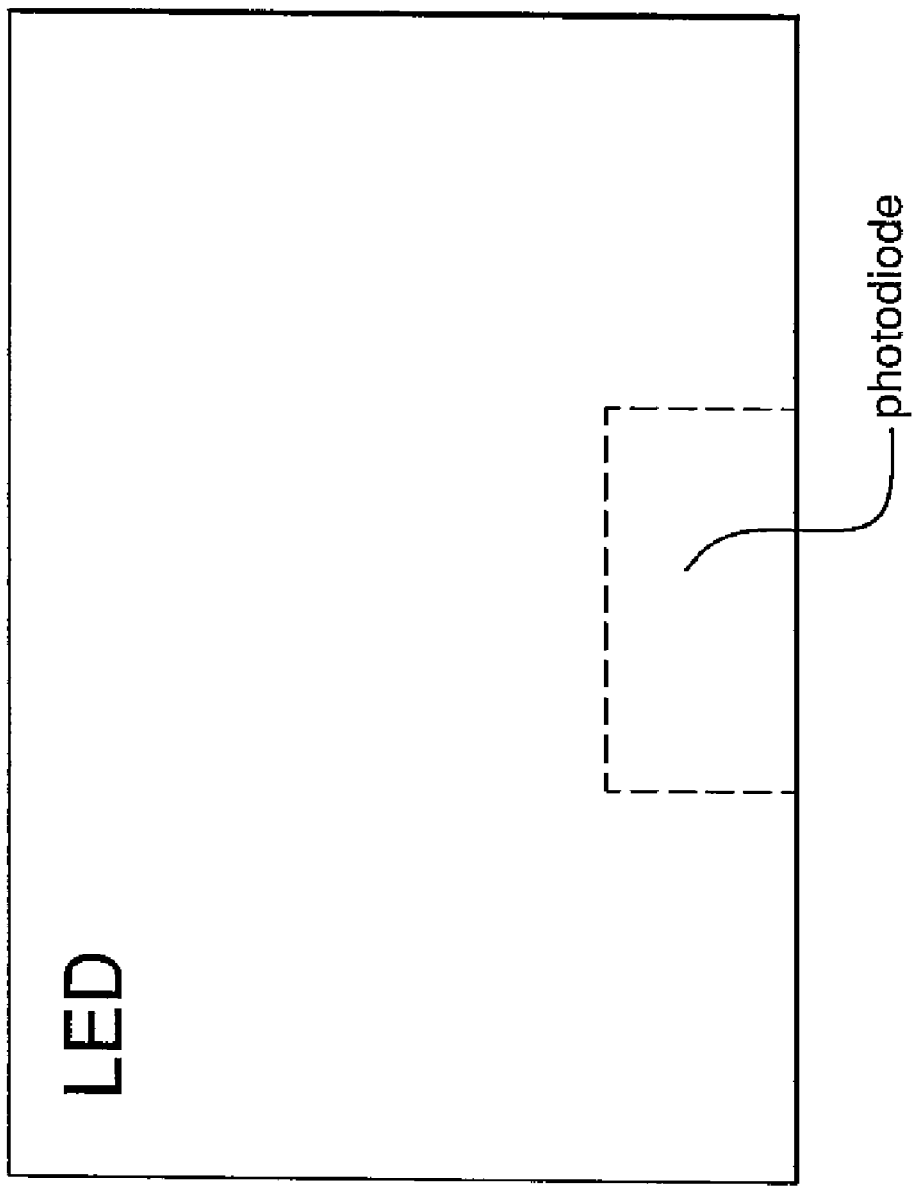
FIG. 10 is a diagrammatic illustration of a light-emitting diode with a photodiode embedded therein.

The prototype system was subsequently operated while varying the set points between 8.067, 7.779, and 7.900 volts while the feedback control loop was active, and then deactivating the closed control loop. Readings of the output intensity of the LED were obtained at each set point with the feedback control loop activated. The intensity was also measured with the control loop deactivated. This procedure was performed at a series of discrete temperatures spanning a range of about −30° C. to about +70° C. The results of this exercise are depicted in FIG. 9, and are likewise considered favorable.

The response of the photodiode used in the prototype system had a specification temperature coefficient of 0.05 percent at the wavelength at which the photodiode was operated. It is believed that the output intensity of the LED of the prototype system can be further stabilized through the use of a photodiode or other detector of optical energy having a response which is less sensitive, or flat with respect to temperature variations. Moreover, a temperature sensor can be added to the prototype system to permit the system to compensate for temperature-induced variations in the response of the detector.

The foregoing description is provided for the purpose of explanation and is not to be construed as limiting. While the embodiments have been described with reference to specific embodiments or methods, it is understood that the words which have been used herein are words of description and illustration, rather than words of limitation. Furthermore, although particular embodiments and methods have been described herein, the appended claims are not intended to be limited to the particulars disclosed herein. Those skilled in the relevant art, having the benefit of the teachings of this specification, may effect numerous modifications to the embodiments and methods as described herein, and changes may be made without departing from the scope of the appended claims.

Figure 11:
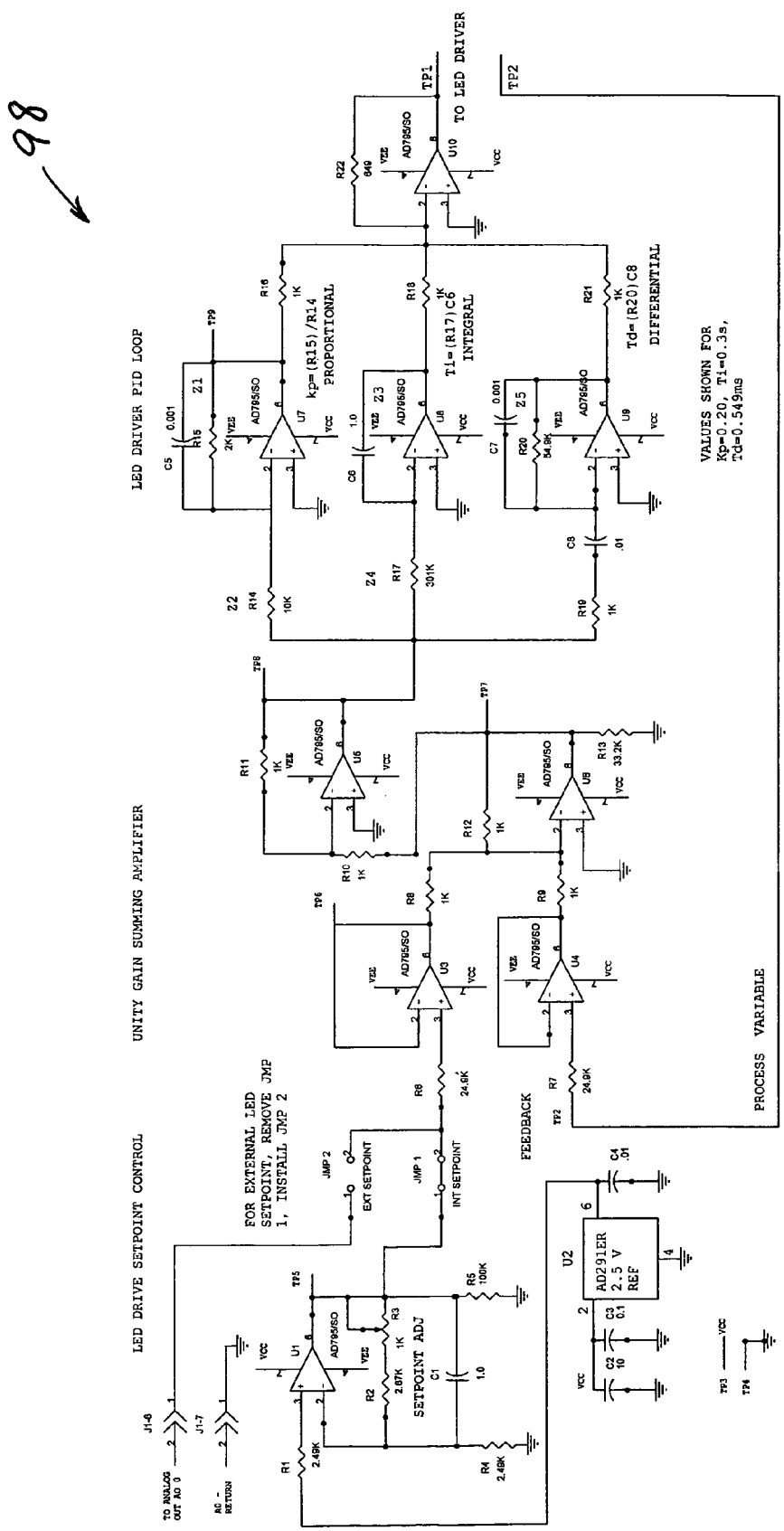
FIG. 11 is a schematic diagram of an electrical circuit that can be used to control the system shown in FIGS. 1-4.

Alternative embodiments can be based on a closed-loop control methodology other than proportional-integral-derivative control. Moreover, closed loop control of the system 11 can be effectuated by hardware, as opposed to the use of software described above. For example, FIG. 11 schematically depicts an electrical circuit 98 can be used to effectuate a PID control loop. The set point voltage used for the control process can be provided by an analog output from a microprocessor, or by a precision voltage supply.

Figure 12:
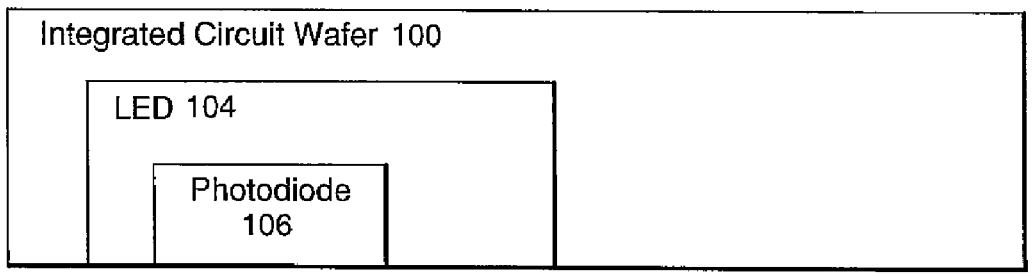
FIG. 12 is a diagrammatic representation of an integrated circuit comprising an LED and a photodiode, wherein the integrated circuit can be used in lieu of the LED and the photodiode depicted in FIG. 2.
Figure 13:
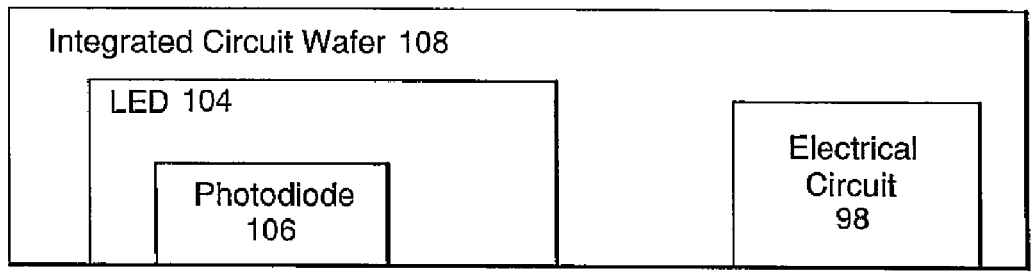
FIG. 13 is a diagrammatic representation of another integrated circuit comprising an LED, a photodiode, and an electrical circuit, wherein the integrated circuit can be used in lieu of the LED and the photodiode depicted in FIG. 2 and the electrical circuit depicted in FIG. 10.
Figure 14:
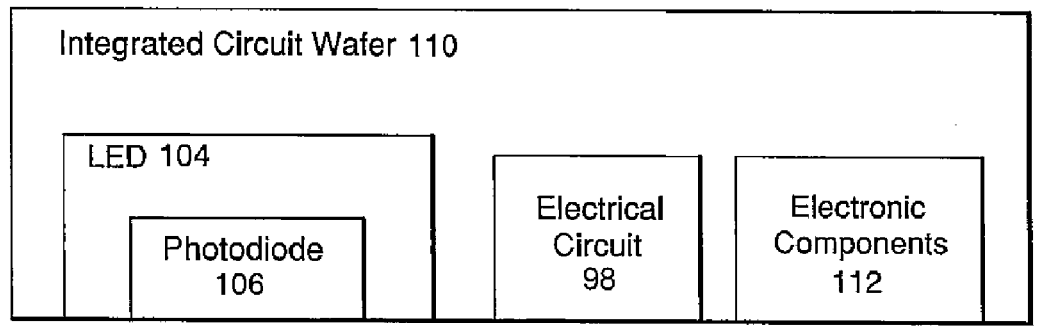
FIG. 14 is a diagrammatic representation of another integrated circuit comprising an LED, a photodiode, an electrical circuit, and additional discrete electronic components, wherein the integrated circuit can be used in lieu of the LED and the photodiode depicted in FIG. 2 and the electrical circuit depicted in FIG. 10.

Alternative embodiments of the system 10 can include an LED, and a photodiode or other detector of optical energy packaged as single unit. For example, alternative embodiments can include an integrated circuit comprising an LED, and a photodiode or other detector of optical energy. FIG. 12 is a diagrammatic representation of one possible configuration for such an integrated circuit. In particular, FIG. 12 depicts an integrated circuit wafer 100 comprising an LED 104, and a photodiode 106 embedded in the active region of the LED 104. Other embodiments can include an integrated circuit wafer 108 comprising the LED 104, the photodiode 106, and a circuit such as the electrical circuit 98, as depicted in FIG. 13. Other embodiments can include a hybrid integrated circuit wafer 110 comprising the LED 104, the photodiode 106, the electrical circuit 98, and other discrete electronic components denoted by the reference character 112 in FIG. 14.

What is claimed is:

1. A system, comprising:
   a light-emitting diode;
   a detector of optical energy in optical communication with the light-emitting diode; and
   a controller communicatively coupled to the light-emitting diode, wherein the controller adjusts an output of the light-emitting diode in response to an output of the detector of optical energy;
   wherein the output of the detector of optical energy is a signal representative of an intensity of optical energy emitted by the light-emitting diode; and
   wherein the controller compares the signal representative of an intensity of the optical energy emitted by the light-emitting diode with a predetermined value and generates an error signal based on a difference between the signal representative of an intensity of the optical energy emitted by the light-emitting diode and the predetermined value, and the controller adjusts an output of the optical energy by the light-emitting diode in response to the error signal.

2. The system of claim 1, wherein the light-emitting diode is a surface-mount light-emitting diode.

3. The system of claim 1, wherein the light-emitting diode is mounted on a first surface of a substrate.

4. The system of claim 3, wherein the light-emitting diode and the detector of optical energy are in optical communication by way of a through hole formed in the substrate.

5. The system of claim 4, wherein the detector of optical energy is mounted on a second surface of the substrate, and the first and second surfaces form opposite sides of the substrate.

6. The system of claim 1, wherein detector of optical energy is a photodiode.

7. The system of claim 1, further comprising a driver circuit communicatively coupled to the controller, the light-emitting diode, and the detector of optical energy, wherein the driver circuit converts an output voltage of the controller into an electrical current, and the driver circuit converts an output current of the detector of optical energy into a voltage.

8. The system of claim 7, wherein the voltage generated by the driver circuit is input to the controller, and the current generated by the driver circuit is input to the light-emitting diode.

9. The system of claim 1, wherein the controller is a closed-loop controller.

10. The system of claim 9, wherein the computing device is programmed with a proportional-integral-differential control algorithm.

11. The system of claim 9, wherein the controller is a proportional-integral-differential controller.

12. The system of claim 1, wherein the controller is a computing device.

13. The system of claim 1, wherein the controller adjusts the output of the optical energy by the light-emitting diode in response to the error signal to reduce the magnitude of the error signal.

14. The system of claim 1, wherein the controller is an electric circuit.

15. The system of claim 1, wherein the light-emitting diode and the detector of optical energy are packaged as a single unit.

16. The system of claim 15, wherein the detector of optical energy is embedded in the light-emitting diode.

17. The system of claim 15, further comprising an integrated circuit, wherein the integrated circuit comprises the light-emitting diode and the detector of optical energy.

18. The system of claim 17, wherein the integrated circuit further comprises the controller.

19. The system of claim 18, wherein the integrated circuit further comprises additional electronic components.

20. The system of claim 1, further comprising a fiber optic cable connected to the light-emitting diode.

21. A method, comprising:
   generating optical energy using a light-emitting diode;
   measuring an intensity of the optical energy;
   changing the intensity of the optical energy in response to the measured intensity of the optical energy; and generating a signal representative of the measured intensity of the optical energy, comparing the signal with a predetermined value, generating an error signal based on a difference between the signal and a predetermined value, and changing the intensity of the optical energy in response to the error signal.

22. The method of claim 21, wherein measuring an intensity of the optical energy comprises measuring the intensity of the optical energy using a detector of optical energy.

23. The method of claim 22, wherein measuring the intensity of the optical energy using the detector of optical energy comprises measuring the intensity of the optical energy using a photodiode.

24. The method of claim 21, wherein changing the intensity of the optical energy in response to the error signal comprises changing the intensity of the optical energy to reduce the error signal.

25. The method of claim 21, further comprising generating a control input and changing the intensity of the optical energy in response to the measured intensity of the optical energy based on the control input.

26. The method of claim 25, wherein generating a control input comprises generating the control input based on a proportional-integral-differential control methodology.

* * * * *